Nov. 13, 1951  R. CARTER, JR  2,574,529
ARTIFICIAL BAIT
Filed April 19, 1949

INVENTOR.
Russell Carter, Jr.
BY
W. Britton Moore
ATTORNEY.

Patented Nov. 13, 1951

2,574,529

UNITED STATES PATENT OFFICE 2,574,529

ARTIFICIAL BAIT

Russell Carter, Jr., Hyattsville, Md.

Application April 19, 1949, Serial No. 88,433

1 Claim. (Cl. 43—42.52)

This invention relates to improvements in artificial bait of the spoon or lure type.

The principal object of the present invention is the provision of an artificial bait having means for imparting a uniform sidewise movement at the front end and a uniform snake-like action at the rear end thereof regardless of the rate of speed it is drawn through the water.

Another object is to provide a spoon which has the desirable characteristics of both a spoon and a plug so that the spoon may be reeled along the surface of or through the water.

Another object is the provision of a spoon which is so shaped that the same will swivel about a vertical axis approximately two-thirds of its length so that the snake-like movements of the rear end thereof will give the optical illusion of the entire spoon twisting in snake-like fashion.

A further object is the provision of a spoon having a skirt at the rear end and so shaped at its front end that two streams of water will be directed along the underside of the spoon to cause the rear end and skirt to wobble in a snake-like fashion.

Still another object is to provide a spoon having a novel shaped front end which tends to plane or rise through the water in such a manner that a vacuum is built up on the upper side of the front end at the rear thereof so that the front end will slip or move sidewise.

These and other objects will be apparent as the specification is considered with the accompanying drawings, wherein Figure 1 is a plan view of my novel lure;

Figure 1:
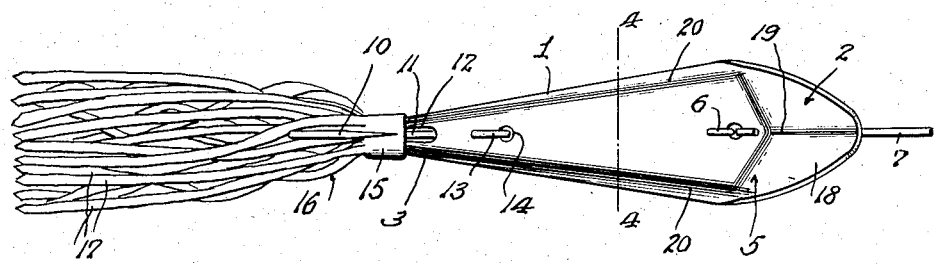
Figure 2:
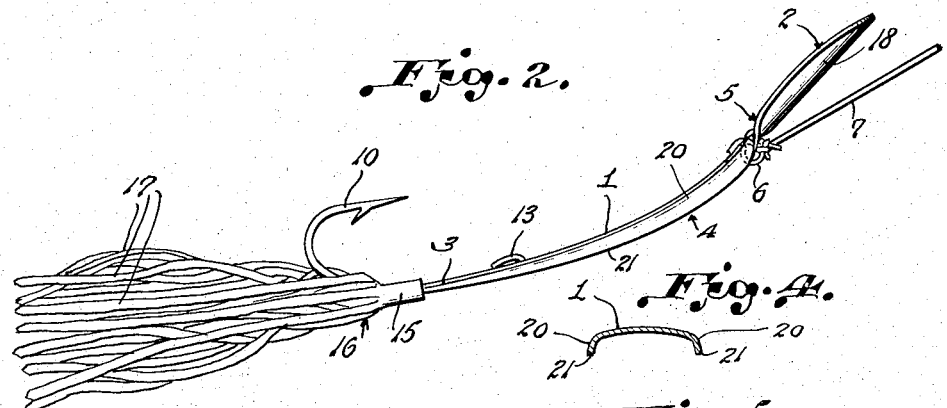
Figure 2 is a side elevation of the lure.
Figure 3:
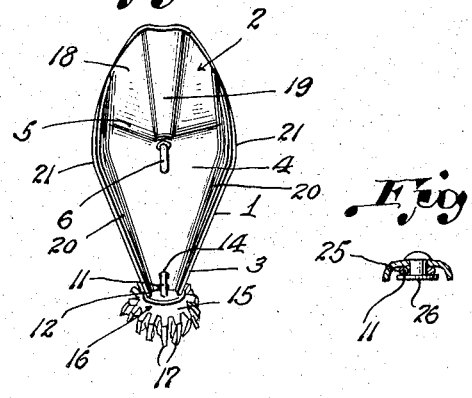
Figure 3 is a front view of the lure.
Figures 4, 5:
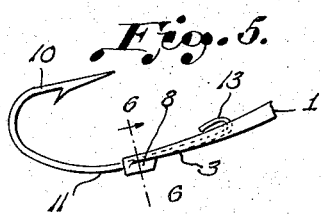
Figure 4 is a section on the line 4—4 of Figure 1.
Figure 5 is a side elevation of the reduced rear end of the lure, with the tail assembly removed therefrom.

Referring more particularly to the drawings wherein like reference characters designate similar parts throughout the several views, the numeral 1 indicates the approximately diamond shaped body of the artificial bait or spoon, which is preferably formed of some suitable metal curved longitudinally in a continuous arc and provided with upturned head and rear portions. The body preferably tapers rearwardly from the head toward a relatively narrow tail portion 3.

Figures 6, 7:
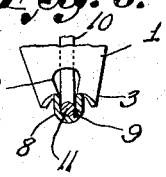
Figure 6 is a section on the line 6—6 of Figure 5.
Figure 7 is a view, partly in section, of a modified form of connection for the hook shank.

Swivelly attached to the underside 4 of the body, at the widest point 5 thereof, is an eye or ring 6 to which a fishing line 7 is secured. The side marginal edges of the body are turned upwardly and inwardly at the rear end as at 8, to provide a groove or channel 9 through which the shank 11 of a barbed hook 10 extends. The shank 11 also extends through an aperture 12, adjacent the rear end of the body, and thence along the underside of the body, and the inner end of the shank is bent upwardly as at 13, through and is secured in a second aperture 14. By virtue of this arrangement, it will be understood that the hook is readily assembled on the body and may be disassembled and removed with ease. As show in Figure 7, the barbed hook shank 11 may be hooked, as at 25, around a stud 26 suitably secured by soldering or the like to the body and depending downwardly from the underside thereof. Any other suitable means may be employed to connect the hook to the lure.

A sleeve 15 of a tail or skirt member 16 is snugly mounted over the rear end of the body so as to encompass the hook shank 11 and serve to hold the latter within the groove or channel 9 in such a manner that the hook may have some slight freedom of movement when a fish is hooked thereon. This is a desirable feature in that it reduces to a minimum the possibility of the hook being wrenched from the body of the spoon. Suitably formed on or secured to the sleeve 15 are a plurality of longitudinally extending strips 17 of any suitable material, such as rubber or fabric. When the spoon is drawn through the water, the tail and the strips thereon are caused to wiggle or wave in somewhat irregular movements, as will hereinafter be described more in detail. If desired, the tail member may be replaced by a pork rind or the like, not shown.

The upturned head portion 2 is curved upwardly and outwardly, as at 18, from the longitudinal axis 19 of the body to provide a substantially concave or V-shaped face on the underside of the forward end thereof. The side marginal edges 20, commencing at the widest point 5 of the body and extending to the rear end, are bent downwardly and outwardly, as at 21 so as to present a substantially U-shaped cross-sectional configuration, for a purpose hereinafter described. Due to the curvature of the forward end of the body, it will be understood that the water is deflected laterally to each side of the body and thence rearwardly thereof in substantially two streams along the underside of the body, between the downwardly bent side marginal edges thereof. As the two streams of water converge into a single stream at the narrow rear end of the body, it will be apparent that the full force of the water flowing along the underside of the body will be directed at the tail and into the strips 17 thereof so that the snake-like or wobbling movements of the latter will be accentuated. Due to the novel shape of the head 2, and the pressure of the water on the underside thereof, a vacuum will be created on the upper side of the body at substantially the widest portion 5 thereof. Thus, as the spoon is drawn through the water the head will plane or rise through the water and the pressure of the water against the underside of the head and the action of the water passing rearwardly along the underside thereof, plus the vacuum created on the upper side and the weight of the tail member 17, will maintain the spoon at an angle of substantially forty-five degrees. That is to say, the spoon rises or planes through the water somewhat in the fashion of a kite in the air. The pull on the line plus the action of the water on the V-shaped bottom face of the head portion 2 causes the head to move or slip at a high rate of speed from side to side, whereas the pressure of the converging streams of water at the rear end results in the tail or skirt 16 wriggling or wobbling from side to side in snake-like fashion. In other words, the movement of the spoon through the water causes water pressure against the underside of the head to move one side thereof sidewise and upwardly until that side offers less resistance to the water whereupon the other side will be moved sidewise and upwardly in the opposite direction until that side also is positioned so as to offer less resistance to the water. That is, the forward end of the spoon slips from side to side and also rocks about its longitudinal axis, which movements continue as long as the spoon is drawn through the water. During this slipping and rocking movement of the front end, the rear end is caused to simultaneously wiggle or wobble. This fast sidewise movement of the head of the spoon acts to camouflage the latter so that the fish will be attracted to the skirt and the hook. This novel dual movement of the head and tail of the spoon is caused by the spoon swivelling or pivoting about a vertical axis at a point approximately two-thirds of its length from the front thereof.

In order to meet varying fishing requirements, it may be desirable to produce lures of different weights. Thus, a weight, not shown, may be suitably mounted on the underside of the body at the rear end thereof to increase the weight of the lure. The weighted rear end will cause the forward end to plane upwardly and has a tendency to increase or accentuate the movements at the front of the body.

In view of the planing action of the head of the spoon, the latter is adapted to be used as a top water bait, in which case the spoon will be reeled so that the spoon will riffle along the surface of the water in addition to moving in the manner hereinbefore described. When reeled at a somewhat slower rate of speed, the spoon will sink below the surface of the water and will be drawn therethrough in the same manner as a plug. It will be understood that the previously described novel movements of the spoon are not affected by the speed of travel of the same through the water. That is, while the movements will be somewhat faster during fast reeling, these movements will still take place, although somewhat slower, when the spoon is reeled at a slower rate.

While I have shown and described a preferred embodiment of my spoon, it is to be understood that various changes and improvements may be made without departing from the scope and spirit of the appended claim.

Having thus described my invention, what I claim is:

A fishing lure comprising a thin metallic approximately diamond shaped body curved longitudinally in a continuous arc, the front and rear portions of said continuous arc of the body pointing upwardly, the forward end of said body having a substantially V-shaped cross sectional configuration with upwardly turned side walls, the rearward portion of the body being arcuately formed along its longitudinal axis into a generally U-shaped cross-sectional configuration with downwardly turned side walls, the rear portion of said body having means for rigidly mounting a hook thereon and means connected to the underside of the lure spaced from the forward end thereof for attaching a fishing line thereto, whereby said body is caused to rock about its longitudinal axis and rise upwardly as the lure is reeled through the water.

RUSSELL CARTER, Jr.

REFERENCES CITED

The following references are of record in the file of this patent:

UNITED STATES PATENTS

| Number | Name | Date |
|---|---|---|
| 1,657,966 | Jordan | Jan. 31, 1928 |
| 1,742,934 | Richardson | Jan. 7, 1930 |
| 1,866,623 | Crow | July 12, 1932 |
| 1,905,407 | Best | Apr. 25, 1933 |
| 2,238,292 | Schavey | Apr. 15, 1941 |
| 2,478,085 | Bruington | Aug. 2, 1949 |
| 2,485,488 | Kennedy | Oct. 18, 1949 |